March 28, 1944.    O. E. ROSEN    2,345,218
DUPLICATING MACHINE
Filed April 8, 1940
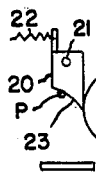
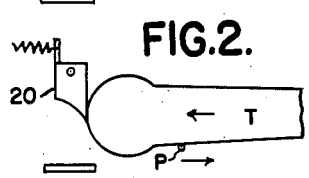
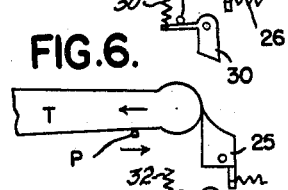
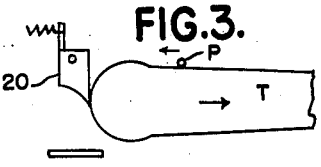
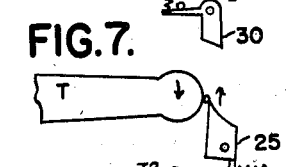
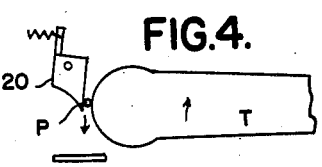
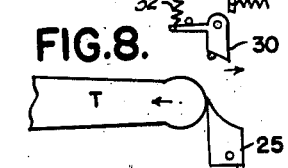
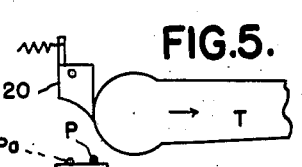
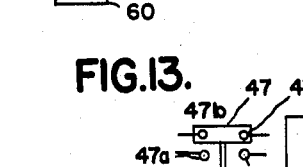
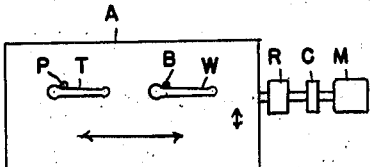
INVENTOR.
OSCAR E. ROSEN
BY *Swan, Frye & Hardesty*
ATTORNEYS Patented Mar. 28, 1944

2,345,218

UNITED STATES PATENT OFFICE 2,345,218

DUPLICATING MACHINE

Oscar E. Rosen, Detroit, Mich.

Application April 8, 1940, Serial No. 328,436

8 Claims. (Cl. 90—13.5)

The present invention relates to duplicating machines and more specifically to such machines constructed and arranged for the edge cutting of plates to reproduce the form of a template.

Among the objects of the invention is the means by which a cutting operation may be continued automatically entirely around a work piece to reproduce the complete contour of a template or other pattern.

Another object is means by which a cutter may be caused to travel in one general direction along one side of a work piece while reproducing one side of a pattern and then automatically reverse the general direction and reproduce the other side of the pattern.

Another object is means by which the cutter, after reproducing one side of a pattern, is caused to leave the work and, after the said reversal of direction, resumes the cutting where it was discontinued and reproduces the other side of the pattern.

Another object is a process of operating a duplicating machine to reproduce the entire contour of a pattern or template.

Other objects will readily occur to those skilled in the art upon reference to the following description and the accompanying drawing, in which:

Figures 1 to 12 inclusive are diagrammatic views showing a template and coacting parts and showing various positions of the tracer.

Figure 13 is a schematic wiring diagram indicating the means by which reversal of the cutting action may be obtained.

Figure 14 is a conventional illustration indicating a work table and operating means therefor.

In the drawing, which is intended not to show actual structure but to be schematic only, Figure 14 represents the work supporting table of any suitable cutting machine, such as a milling machine with a vertical spindle, and represents conventionally the drive means for moving the table in two directions.

For example, the table A is movable in either direction longitudinally by a motor M with direction reversing means at R, and is movable in either direction laterally by the unit U. The device indicated at C is an automatic clutch, the purpose of which will appear later.

Upon the table A will be secured a template T and a work piece W in position to be acted upon by a tracer finger P and cutter B, respectively. With the table A being moved longitudinally by motor M, the unit U is tracer controlled to cause the forward and backward movement to thereby cause the cutter to reproduce the longitudinal profile of the template.

The unit U and its control is preferably of the type of construction shown in the U. S. patent to Rosen, No. 2,138,208, issued November 29, 1938, on "Duplicating machine."

In addition, however, to the drive unit U, there is also used an automatic tracer controlled clutch C between the drive motor M and the reversing unit R. This clutch is constructed and arranged to be actuated under control of the tracer to slow down or stop the longitudinal drive when the tracer encounters a steep incline in either direction or an abrupt wall or hole.

Such a clutch and tracer combination is shown in the Rosen application for U. S. patent, Serial No. 245,710, filed December 14, 1938, "Control devices for duplicating machines."

In this application, the tracer described consists of a tracer body carrying at its lower end a movable finger which, in its idle or uninfluenced position, is centered with respect to the body. At the other end of the body is the electrical contact mechanism so constructed that, when the finger is uninfluenced, the contacts are active to control the machine movement toward the finger and such movement continues until the pattern contacts the finger and moves the latter slightly to a "neutral" position.

It will be noted that any movement of the finger from its idle or uninfluenced centered position produces the same effect on the contacts, whether it be laterally from side contact or longitudinally from end contact, but, since in the present case the tracer is mounted perpendicular to the plane of the template, only the lateral movement is important.

With the arrangement above indicated, it is possible to reproduce first one side of the template and, then, after returning the table to the starting position, to reproduce the other side. This method of operation is objectionable for several reasons not the least of which are the time element and the need for attention by the operator.

In the present invention, once the operation is started, both sides and the ends of the template may be reproduced and the machine stopped, all automatically.

The accomplishment of this result may be had by the means indicated in Figs. 1 to 13 inclusive.

As indicated in these figures, at the starting end of the template T is arranged a small starting plate 20 pivoted as at 21 and held lightly against the end of the template by a light spring 22. The end of the plate opposite the spring 22 is shaped to form a curve 23 of rather large radius ending at the corner, which rests against the template, to produce a sharp edge so that the curve is continuous with that of the edge of the template T, and so that the tracer as it leaves the plate is travelling tangent to the curve of the template.

At the other end of the template is pivoted a similar starting plate 25 but oppositely arranged, this also being pressed lightly against the template by a light spring 26. At this end also and spaced a short distance to one side of the template is pivoted a second small plate 30 held against a stop 31 by means of a light spring 32. This plate 30 is of less width than the plate 25 and is so located that its end is opposite the curved end of plate 25 and has that side which is toward the template in line with the end of the latter.

In applying the invention to a conventional cutting machine provided with automatic reversing means, the trip mechanism, whatever it may be, mechanical or electrical, is re-arranged to be actuated, when the table is moved beyond a predetermined point. Further, the reversing mechanism will be so arranged that, when the table reaches and actuates the mechanism, it will, at the same time, reverse the circuits from the tracer to the drive unit controlled thereby.

Such reversing mechanism is indicated schematically in Fig. 13, and is indicated as operated by means of a solenoid 40 energized through the action of a switch 41 in turn actuated by the moving table as indicated above, current being supplied to the tracer 50 and solenoid 40 through the supply lead 39.

When the solenoid 40 is energized, it pulls down the switch rod 42 carrying the switch blades 43, 44, 45, and 46 and also the blade 47.

Of these the blade 47 is moved from contacts 47b to 47a, these representing circuits controlling the operation of the reverse mechanism R to cause the longitudinal movement of the table to be reversed, and at the same time, the blades 43 and 44 are moved to the contacts 43a and 44a respectively, while the blades 45 and 46 are moved away from contacts 45a and 46a.

This action, it will be noted, reverses the circuits from the tracer 50 to the solenoids 51 and 52. As the circuits are indicated in the figure, the lead 50a is connected through contacts 46a, and blade 46 to solenoid 51 and lead 50b is connected through contacts 45a and blade 45 to solenoid 52. When, however, the blades are moved down, the leads 50a and 50b become connected to solenoids 52 and 51, respectively.

Since the tracer 50, through the solenoids 51 and 52, controls the backward and forward movement of the table A, the effect of the tracer upon this movement will thus be reversed.

The two solenoids 51 and 52 represent the solenoids of the valve mechanism shown and described in the Patent No. 2,138,208, above mentioned. These solenoids, as described in said patent, are alternately put in circuit by the tracer, and while one of them causes relative movement of the work and cutter "forward," the other causes a movement "backward" with reference to the front of the machine.

The tracer control of the clutch C is however not affected and the latter will be actuated to control the longitudinal movement of table A in the same manner as before reversal.

Figures 1 to 12 illustrate the action of the present invention in the reproduction of a template, for example, one shaped as shown at T.

In these figures the tracer finger is indicated by the small circle P and, while the cutter is not shown, it will be understood that this follows a path which is the duplicate of the path of the tracer.

In these figures, with the machine at rest, the tracer finger will be, for example, at the location Pa (Fig. 5), since provision may be made for stopping the machine when the tracer has returned to this point after once traveling over its path.

With the tracer finger then at Pa, when the machine is started, the unit U starts moving the table A downwardly until the finger P strikes the plate 20, the clutch C during this movement being actuated to disconnect the motor M from its drive.

As soon, however, as the finger P strikes plate 20, the clutch C connects the motor M to its drive mechanism and the table A moves toward the left as indicated by the arrow Ma. At the same time, however, the tracer through the drive unit U and clutch C causes the movement of the table A upward and the tracer follows the curve 23 until the finger reaches the template which it follows, as indicated in Fig. 2.

After passing around the other end of the template the finger P passes along the upper side as in Fig. 3 and over the rounded end. The longitudinal movement of the template comes gradually to a stop as the finger reaches the position of Fig. 4, moving the plate 20 out of its way, and, since the longitudinal movement has stopped, the tracer P continues directly downward until it strikes the stop 60. The longitudinal movement is again set up and the tracer travels along to position Pa. (See Fig. 5.)

Automatic means may be provided to stop the machine at this point as in the conventional machine or it may be stopped by the operator.

The operation at the other end of the template is illustrated in Figs. 6 to 12.

In Fig. 6 the finger P is seen traveling relatively toward the right, and, as it passes over the end of the template, it moves out of its way the plate 25 as in Fig. 7. It then moves directly upward, as the longitudinal movement of the template has completely ceased, until it strikes the plate 30 as in Fig. 8, and causes the longitudinal movement to be resumed.

With the resumption of the longitudinal movement, the plate 30 is swung as in Fig. 9 until, finally, the tracer finger moves from the corner of the plate, allowing the latter to swing back against the stop 31, whereupon the longitudinal movement stops and the tracer immediately starts upward again. (See Fig. 10.)

At a suitable point in this last upward free movement of the tracer, or rather, the downward movement of the table, the reverse means is actuated with the result that the table immediately stops and starts up again. This being the case, the tracer travels directly down until it strikes the curved side of plate 25 as in Fig. 12 and in so doing sets the table in motion toward the right.

The tracer travel is then, of course, along this curved edge to the template and along the upper side thereof to the final stopping position at Pa.

I claim:

1. A duplicating machine for duplicating the entire contour of a suitable template consisting of a cutter head having a cutter carried thereby and a work support movable relatively to said cutter head in two directions at right angles to each other and backward and forward in each, means for mounting upon said work support a template and a workpiece in fixed relation, a tracer, means for mounting said tracer on said cutter head in the same relation to said cutter as said template bears to said workpiece, means under control of said tracer for causing said movement forward and backward in one direction, means for causing movement forward in the other direction, speed controlling means for said latter movement under control of said tracer, and means for reversing the direction of said latter movement and at the same time reversing the effect of said tracer control on said first movement.

2. In a tracer controlled duplicating cutting machine in which the feed of the workpiece toward and from the cutter is tracer controlled while the workpiece is being moved past the cutter, means for reversing the latter movement and simultaneously reversing the tracer controlling effect.

3. In a tracer controlled duplicating cutting machine in which the feed of the workpiece toward and from the cutter is tracer-controlled while the workpiece is being moved past the cutter, means for reversing the latter movement and simultaneously reversing the tracer controlling effect, said means being arranged to be operable after said movement has carried the tracer out of contact with the pattern.

4. In a tracer controlled duplicating machine, a work table movable forward and backward in two directions at right angles to each other, means under control of said tracer for moving said table forward and backward in one of said directions, other means for moving said table in the other direction and means for reversing the latter moving means and for simultaneously reversing the action of said tracer upon the forward and backward movement.

5. In a tracer controlled duplicating cutting machine wherein the action of a pattern upon a tracer controls the action of the cutter upon a workpiece, means for bringing the tracer and pattern together and guide means for directing such movement.

6. In a tracer controlled duplicating cutting machine wherein the tracer controls the movement of the cutter backward and forward in one line of movement, means for reversing the controlling action of said tracer.

7. In a cutting machine having means for reversing the longitudinal movement thereof, means for producing lateral movement thereof during such longitudinal movement and means for actuating said reversing means and operable by such lateral movement when the latter reaches a predetermined maximum.

8. In a tracer controlled duplicating cutting machine, in which the action of a pattern on the tracer controls the movement of the workpiece relative to the cuter, similar guide plates mounted in reverse position at each extremity of the pattern for directing the approach of said tracer to said pattern whereby the tracer is directed toward one side of said pattern at one extremity and toward the other side of said pattern at the other extremity, and means for reversing part of the controlling action of the tracer after it has reached one extremity of the pattern.

OSCAR E. ROSEN.